3,540,963
METHOD OF MAKING A COMPOSITE
ABSORBENT LAMINATE
Charles D. Dipner, Cranford, N.J., assignor to Johnson &
Johnson, a corporation of New Jersey
Original application May 18, 1964, Ser. No. 367,989, now
Patent No. 3,423,277, dated Jan. 21, 1969. Divided and
this application Dec. 1, 1967, Ser. No. 725,961
Int. Cl. B29d 7/00; B32b 31/00
U.S. Cl. 156—244
5 Claims

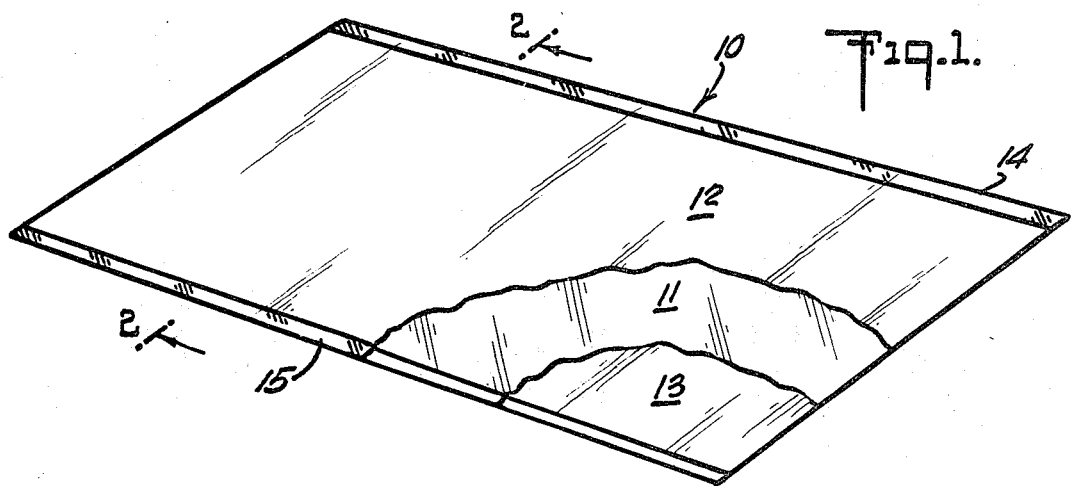
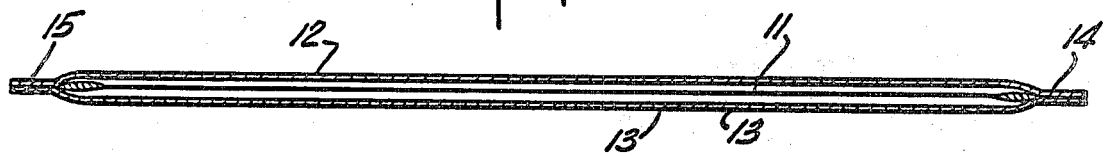
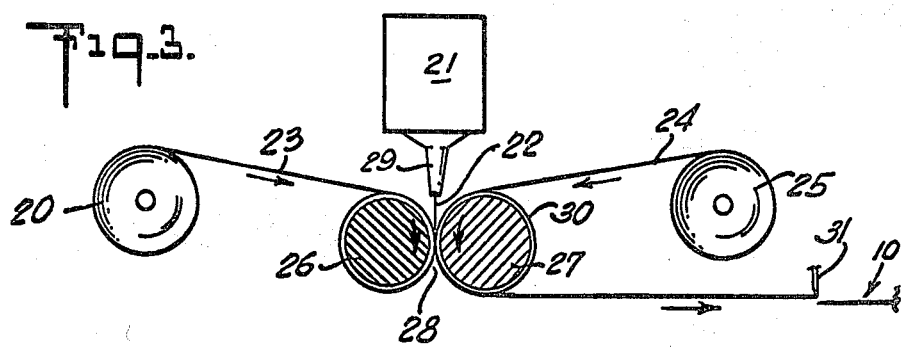
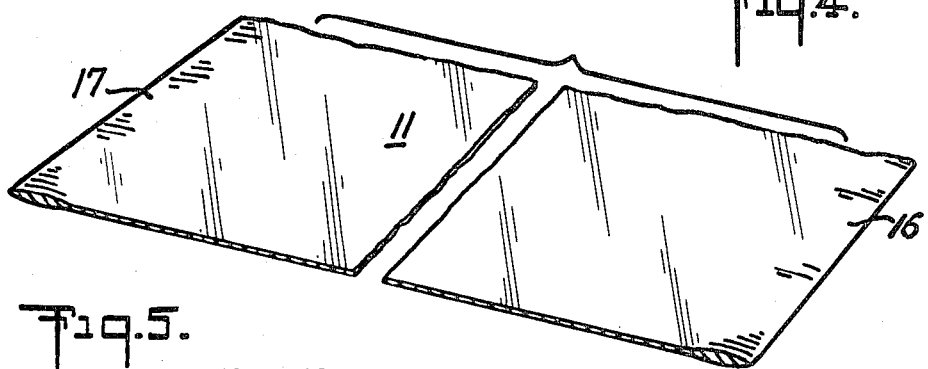
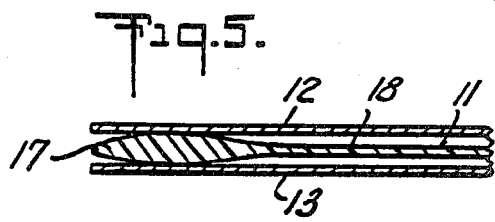
INVENTOR.
CHARLES D. DIPNER
BY
Harold L. Warner
ATTORNEY United States Patent Office 3,540,963
Patented Nov. 17, 1970

ABSTRACT OF THE DISCLOSURE

Water impermeable absorbent laminates of absorbent flexible sheet material and water impermeable film are prepared utilizing thermoplastic films having softening temperatures above 300° F. by using film having in the main body of the film a thickness of not over 0.3 mil and side edges of thickness several times this. The film is bonded to the absorbent sheet only along the thicker side edges. The laminate is prepared by heat extruding the polymer onto the absorbent sheet the extruded polymer sheet passing through an air gap in which the edges of the film so formed thicken prior to contact of the extruded polymer film with the absorbent sheet. The thickened edges, while still heat softened, are bonded by pressure to the absorbent sheet.

This is a division of application Ser. No. 367,989, filed May 18, 1964, now Pat. No. 3,423,277 issued Jan. 21, 1969.

The present invention relates to absorbent disposable sheets and more particularly to absorbent disposable sheets and drapes that are impermeable to the passage of bacteria therethrough and are particularly suitable for use in hospitals and the like.

In surgical practice in hospitals, clinics, doctors offices etc., the doctor or surgeon, while working on the patient, needs a sterile area on which to lay instruments, dressings, and such other items with which he may be working. The present invention is drawn to disposable surgical drapes which are suitable for providing such areas. The surface over which the drape for supplying the sterile area is placed is not necessarily always flat.

For example, the drape may be laid on a portion of the patient's bed or over a part of the patient, adjacent the area being treated. Also the drape may be laid on only a portion of a dressing cart or some other surface smaller than the drape with the result that the drape extends beyond the surface. In all such situations, it is important that the drape be sufficiently limp or drapable to conform to the underlying surface or to hang down over the edge of the support where larger than the support.

Besides being sufficiently limp to drape properly the drape should be absorbent. The surface of the drape should also provide sufficient friction that it does not slide off of the supporting surface over which it has been placed and the drape surface should be free of lint or loose fibers that may adhere to articles placed thereon.

By having the surface of the drape absorbent, the drape will absorb any medication or other liquid that may be spilled on it. Also, the drape may be used as a towel or the like where desired to wipe instruments, hands, etc. However, one of the disadvantages of absorbent sheet material is that once a sheet of conventional absorbent material has been wetted, even though the surface of the sheet was previously sterile, bacteria from an underlying nonsterile supporting surface can then readily pass through the wetted sheet to the upper surface thus contaminating the same.

In copending application Ser. No. 364,707 filed on May 4, 1964, is described an absorbent drape containing a film barrier which prevents the passage of bacteria through the drape when the same has become wetted. The drapes, as provided to the user, are sterile the same being packaged and sealed in a container or wrapper pervious to sterilizing gases and then sterilized after packaging. By sterilizing the drape after packaging the same is maintained sterile until used by the doctor or surgeon.

The drapes of application Ser. No. 364,707 comprise a composite absorbent sheet-like product that contains a thin water and alcohol impervious film placed between absorbent sheets, which where single sheets are used, form the outer surfaces of the drape. The absorbent sheet and the barrier film are bonded together along at least two opposing edges to form the composite drape.

One of the difficulties in making surgical drapes of this type is that when film materials are used for the barrier film which have sufficiently high melting or softening temperatures to permit their steam sterilization they are generally too stiff to permit their use. As most sterilization done in hospitals, clinics, most doctors offices and the like is done by steam sterilization in autoclaves forming materials having softening temperatures below 250° F. such for example as low density polyethylene cannot be used in making drapes that are to be sterilized by the purchaser but must be sold sterile in individual wrappers or packages in order to be sterile when used. Films made of higher softening point film forming materials are, for the same thickness, substantially less drapable than those formed of lower softening point materials such as polyethylene. This more rigid nature of the higher melting point films has made then generally unsatisfactory for use in forming such drapes, the films formed from the same interfering with the drapability of the final product. Among such higher softening temperature film forming materials are, for example, nylon, polypropylene and polyesters such for example, as polyethylene terephthalate. Accordingly, prior to the present invention, the preferred film-forming material for forming such drapes has been polyethylene or other film materials more flexible than nylon which can be formed into suitably limp and flexible films for use in such drapes at thicknesses of about 0.4 to 1.0 mil. Even at thicknesses as much as 1.0 mil the polyethylene films are sufficiently flexible for use in such surgical drape products. However, as previously indicated the materials which form the more flexible films such as polyethylene all have the common disadvantage that they melt at temperatures too low to permit steam sterilization and thus require, where used in surgical drape construction, sterilization by low temperature sterilization methods such, for example, as ethylene oxide sterilization or radiation sterilization, which sterilization procedures are not generally available to hospitals, clinics, and the like. Where, however, the higher fusion temperature film-forming polymers such as nylon are used in a thickness of about 0.4 mil, that is in thicknesses comparable to the lower thicknesses for polyethylene films, when formed into the composite drape, using the same absorbent papers as used with the polyethylene film, the composite drape is not sufficiently drapable for satisfactory use as a surgical drape. When the film forming polymers having higher softening temperatures are formed in sufficiently thin films however, to have the desired draping characteristic when used with the absorbent papers the same are then too thin to enable a satisfactory seal to be made to the adjacent absorbent sheets where the sealing is done by fusing the film to the adjacent absorbent sheet materials.

It is an object of the present invention to form absorbent composite sheets containing a film barrier impervious to bacteria wherein the film is sufficiently limp when combined with an absorbent sheet to be drapable and in which the film is formed of a material having a sufficiently high melting or fusing temperature to permit the resulting composite sheet to be steam sterilized. It is a further object of the present invention to form a composite drapable absorbent sheet containing a water and alcohol impervious film barrier of limp drapable film in which the softening temperature of the film is sufficiently high to permit steam sterilization without softening and in which the film is bonded along its edge through the thermoplastic nature of the film to an absorbent covering sheet. It is a still further object of the present invention to form a steam sterilizable surgical drape containing a thin drapable thermoplastic film barrier impervious to water and alcohol in which the film is bonded adjacent its edge through fusion to adjacent absorbent sheet material the film being unbonded to the absorbent sheet material over the major portion of said drape. Other objects and advantages of this invention will become apparent from the following description taken in connection with the accompanying drawings, wherein are set forth by way of illustration and example certain embodiments of this invention.

In accordance with the present invention the film used in making the composite absorbent sheet is formed so as to be several times thicker along two opposed side edges than in the main body of the film. The film is formed by heat extrusion and is sealed directly after forming and while its thickened side edges are still heat softened, to the adjacent absorbent sheet or sheets along such thicker side edges which are several times thicker than the main body of the film. In this way the film can be made sufficiently thin in the main body portion of the film which lies between the thicker side edges to provide the desirable flexibility and draping characteristics which are so necessary in order to provide a satisfactory product. At the same time a satisfactory seal is obtained along the edge of the film to adjacent sheets through fusion of the film to the absorbent sheet material while the center portion, that is the main body portion, is free. Although, insofar as I am aware, any film-forming material can be used that has sufficient strength and water and alcohol impermeability to provide the bacteria barrier in the composite absorbent drape, the advantages of the invention are particularly applicable to the use of thermoplastic film-forming materials wherein the melting or softening temperature of the films is above 300 degrees Fahrenheit. As heat extruded nylon film is particularly suitable for practicing the present invention nylon will be used as a specific example of the film-forming material in order to illustrate the advantages of the present invention and the manner of practicing the same. The invention, however, is not limited to nylon as other film-forming materials may be employed.

Heat extrudable nylon polymers have softening temperatures above above 400° F. In thicknesses of about 0.5 ml, films formed of such heat extrudable nylon polymers have essentially no drape. As the film thickness is decreased, the stiffness of the film decreases to the point where film thicknesses in the order of about 0.3 mil and lower show essentially no stiffness and drape readily over uneven surfaces. These films can be used in thicknesses as low as 0.1 mil. When nylon films of about 0.15 mil are formed into drapes, using the same absorbent sheet materials as for 0.4 mil polyethylene film, the nylon film drapes have excellent draping qualities, even superior to that formed using the polyethylene film. Such nylon films are excellent for forming the water and bacteria barrier in absorbent drapes. However, at thicknesses of about .3 mil for nylon film a satisfactory edge seal cannot be obtained through fusion of the film to the adjacent absorbent sheets. At these thicknesses pinholes develop at the seal. Also a good bond is difficult to obtain and cannot be obtained at thicknesses at about .2 mil. With softer films such, for example, as polyethylene the fibers of the absorbent sheet material with film in the order of 1.0 mil, are found to penetrate completely through the barrier film, thus acting to wick fluids therethrough.

In accordance with the present invention the film to be used as the barrier is formed by extrusion. While the film is being extruded it draws in at the side edges as it passes through the air gap from the die to the absorbent sheets. The degree of drawing in can be controlled by varying this distance. This narrowing of the film with the thickening of the edges as the film leaves the die is apparently caused by the cooling of the film-forming material as it leaves the extruder. By heat extruding the film and controlling the air gap (the distance the film travels from the die to where it is bonded to the absorbent) a film is obtained with edges having a thickness several times the thickness of the main body of the film but which are still heat softened. This thicker portion at the side edges extends in from the edge for about ½ to 2 inches. By using films formed in this manner there is sufficient thickness of the film at the edge even though the center portion of the film is extremely thin, to enable a good thermoplastic seal to be obtained and to avoid penetration of the fibers of the absorbent facing sheet through the film at the point of seal. At the same time, the man body of the film, between the sealed edges is sufficiently thin to have excellent draping quality. In order to take full advantage of the thicker edge portions, the extrusion is controlled so that the extruded film is of substantially the same width as the absorbent sheet to which it is bonded.

Referring to the drawing:

FIG. 1 is a prospective view of a surgical drape made in accordance with the present invention with a portion of the drape broken away to show its construction;

FIG. 2 is a cross-sectional view taken along line 2—2 of FIG. 1;

FIG. 3 is a schematic sketch of apparatus showing the formation of the surgical drape of FIGS. 1 and 2 and FIG. 4 is a cross-sectional view of the barrier film; and FIG. 5 is a cross section of an enlarged schematic detailed view of one edge of the film of FIG. 4 positioned between covering sheets.

Referring to the drawings drape 10 contains a film barrier 11, formed of nylon, faced on one side with absorbent paper sheet 12 and on the other side with absorbent paper sheet 13. The film barrier 11 and the absorbent sheets 12 and 13 are bonded together along their edges by fusion of the thermoplastic material of barrier sheet 11 to the absorbent sheets 12 and 13 to form bonded edge zones 14 and 15 extending along each aide of the absorbent drape.

The barrier film 11, at its edge portions 16 and 17, is substantially thicker than in the main body of barrier film 11. This reltaively thin intermediate portion 18, which forms the main body of barrier film 11, is free of any bond to absorbent sheets 12 and 13, the assembly being bonded together solely along the thickened edges of the film 17 and 16. Although in FIG. 2 the film barrier 11 is shown as spaced from the absorbent sheets 12 and 13 in the central portion this results primarily from the difficulty in illustration and the absorbent sheets 12 and 13 are in contact with though not bonded to the barrier film 11 over most of its surface.

Where the barrier film 11 is made of a thermoplastic material having a softening temperature much in excess of about 300° F. the main body portion 18 of the film should have a thickness of not more than about 0.3 mil otherwise the film is found to be not sufficiently limp to give a satisfactory drape when combined with the absorbent sheets in the finished drape.

As previously indicated, the thickness of the edges 16 and 17 of the film should be several times the thickness of the main body portion 18 lying between the thicker side edges. Thus, for example, where a nylon film is used the center or main body portion 18 of the film should have a thickness of not over 0.3 and preferably in the range of 0.1 mil to 0.2 mil while the thickened edges 17 and 18 should have a thickness of not less than about .75 mil and preferably in the range of about 1.0 to 2.0 mils. Thus an excellent barrier film would be one in which the film is made of nylon and in which the main body portion 18 of the film has a thickness of about .2 mil and the side edges 17 to 16 each have a thickness in the order of about 2.0 mil.

The thicker portions 17 and 18 of the barrier film 11 extends inwardly from the edge for about ½ to 2 inches tapering off rapidly into the thin body portion 18 which forms the main body of the film barrier.

In the preferred practice of the present invention the drapes are made by a continuous process in which the film 22 is extruded downwardly between two absorbent sheets 23 and 24 as illustrated schematically in FIG. 3. Referring to FIG. 3 webs 23 and 24 of absorbent paper are fed from paper supply rolls 20 and 25 to the nip 28 formed between pressure rolls 26 and 27. A film 22 extruded downwardly through the die 29 from extruder 21 passes into the nip 28 between the two absorbent sheets 23 and 24. Roll 27, which is chilled, contains a pair of raised ridges 30 which apply pressure at the nip 28 only in the area of the ridges. Roll 26 is undercut in the area between which pressure is applied by the ridges on roll 27. The extrusion of the film is controlled so that at the point it enters the nip 28 it has substantially the same width as the absorbent sheets 23 and 24. Where the barrier film is nylon, the extruder is preferably operated at a temperature of 510° F. to 600° F. depending on the particular nylon used. The film 22 as it leaves the die of the extruder 21 draws in at its side edges to form the thickened edge portions 17 and 16. The distance between the die 29 of the extruder and the nip 28 is maintained relatively short, about 4 to 5 inches so that the extruded film is still in a heat softened state particularly at the thickened edge portions. The distance between the raised ridges 30—30 on roll 27 is slightly less than that of the extruded film 22 and absorbent sheets 23 and 24 so as to apply pressure as the sheets pass through nip 28 only along the thickened edges of the film 22 and the edges of the absorbent sheets 23 and 24 to bond the film at its thicker edge portions to sheets 23 and 24 and thus form a continuous laminate absorbent sheet. The bonded laminate after it passes through nip 28 passes around roll 27 which is cooled to a temperature of about 70° F.– 90° F. It then passes from cooling roll 27 to cutters 31, where it is cut into the desired lengths to form individual drapes of the type illustrated in FIGS. 1 and 2. The pressure roll 27, which as previously indicated is chilled, is maintained at a temperature of about 70–90° F. by circulation of water therethrough. It is found, that by immediately chilling the laminate as it is formed the nylon film is given more drape and is limper, for the same thickness, then where no such chilling is used.

The following example will help to illustrate the practice of the present invention. The example is given for the purposes of illustration only and the present invention is not limited thereto.

EXAMPLE 1

Using apparatus similar to that schematically illustrated in FIG. 4 a nylon film is extruded between two webs of dry creped, facial quality absorbent paper of 17" width. The paper of the webs has a weight of about 19 lbs. per ream, a wet tensile strength in the machine direction of about 250 grams per inch, and contains substantially no free fibers. The nylon used is a nylon sold under the trade name Zytel, FE 2353 and has a melting temperature of 455° F. The film is extruded at a temperature of about 570° F. The air gap, that is the distance the film travels between the die and the point at which the film contacts the absorbent paper at the nip between the pressure rolls, is 4 to 5 inches. The width of the extertruder die is 30". The width of the extruder film is controlled so as to be substantially the same as the width of the paper webs by the time it contacts the paper webs at the nip at the end of the air gap. The film is extruded to a thickness of about .2 mil. By the time the film passes through the air gap and contacts the absorbent webs the edges have drawn in and have increased in thickness to about 2.0 mil. The thickened portion extends inwardly for about ½ inch from the film edge, then tapering rapidly into the thinner .2 mil film which forms the main body of the extruded film sheet.

The nip between which the two paper webs and the freshly extruded film pass, at the end of the air gap, is formed by two rolls one roll having a rubber surface the other, which is chilled to a temperature of 70° F., has a smooth metal surface except for two raised circumferential ridges so spaced as to press on the edges of the paper webs and film as it passes through the nip. A pressure of about 40 lbs. per linear inch is used to bond the edges. The pressure on the edges is applied while the edges of the film are still heat softened.

After the absorbent laminate with the film barrier has been formed the same is cut into sections to form the absorbent sheets. These sections have a length of about 30 inches, a length found to be well suited for their use as surgical drapes.

The drapes, so formed, have no bonding of the nylon film to the absorbent paper sheets except along the edges. The possess excellent draping qualities and show no stiffness due to the film contained therein. Drapes formed in the manner described are placed into an autoclave and steam sterilized at a temperature of 250° F. for 30 minutes. The drapes are then removed. There is no damage to the nylon film barrier. The nylon film barrier is free of pinholes both before and after sterilization. Also there is no bonding or sticking to the absorbent facing sheets other than where initially bonded at the edges.

Having thus described my invention I claim:

1. The method of making a composite absorbent laminate comprising heat extruding a thermoplastic film, to a film thickness of not over .3 mil, downwardly between two absorbent sheets, slightly cooling said film as it passes to said absorbent sheets to cause lateral shrinkage of said film with thickening of the side edges, controlling the lateral shrinkage of said film to a predetermined width, placing said film with said thickened edges between said absorbent sheets while said thickened edges are still in a heat softened state and pressing said sheets only along the thickened edge of said film while said thickened edges are still in said heat softened state to bond said film to said absorbent sheet along said thickened edges alone.

2. The method of making composite absorbent laminates comprising heat extruding a thermoplastic film formed of film-forming material of the group consisting of nylon, polypropylene and polyesters to a film thickness of not over .3 mil, slightly cooling said film to cause lateral shrinkage of said film with thickening of its side edges while maintaining said film at a temperature above the softening temperatures of said film at said side edges, controlling the lateral shrinkage of said film to a predetermined width, passing said film with its side edges still heat softened downwardly between two absorbent sheets and selectively pressing said absorbent sheets together only along said thickened side edges of said film as said film passes downwardly between the same to cause said film to bond along its thickened side edge to said absorbent sheets while not bonding said film to said absorbent sheets between the bonded edges thereof.

3. The process of claim 2 in which said absorbent sheets are formed of absorbent paper.

4. The process of claim 3 in which said film is formed of nylon and in which the main body of said film between said thickened edges has a thickness of .1 to .3 mil.

5. The process of claim 4 in which said absorbent paper sheets are of substantially the same width and in which the width of said extruded film is controlled during extrusion to substantially match that of said paper sheets.

References Cited

UNITED STATES PATENTS

| | | | |
|---|---|---|---|
| 2,380,914 | 8/1945 | Billeb | 156—292 XR |
| 3,075,868 | 1/1963 | Long | 156—244 XR |
| 3,130,647 | 4/1964 | Anderson et al. | 156—244 XR |
| 3,340,124 | 9/1967 | Lowe et al. | 156—244 |
| 3,347,727 | 10/1967 | Bobkowicz et al. | 156—244 |
| 3,407,103 | 10/1968 | Pherson et al. | 156—202 |

FOREIGN PATENTS 726,949 3/1955 Great Britain.

JOHN T. GOOLKASIAN, Primary Examiner

G. W. MOXON, II, Assistant Examiner

U.S. Cl. X.R.

156—84, 290; 161—44, 45, 86, 149